United States Patent [19]
Belser et al.

[11] Patent Number: 5,480,589
[45] Date of Patent: Jan. 2, 1996

[54] METHOD AND APPARATUS FOR PRODUCING CLOSED CELL FOAM

[75] Inventors: Robert S. Belser, Bay Village; John R. Tark, Avon Lake; Charles A. Hall, Lorain, all of Ohio

[73] Assignee: Nordson Corporation, Westlake, Ohio

[21] Appl. No.: 313,359

[22] Filed: Sep. 27, 1994

[51] Int. Cl.⁶ .................................................. B01F 3/04
[52] U.S. Cl. ................................ 261/76; 261/DIG. 26; 366/338
[58] Field of Search ............................. 261/76, DIG. 26; 366/338

[56] References Cited

U.S. PATENT DOCUMENTS

| | | |
|---|---|---|
| Re. 29,665 | 6/1978 | Gusmer et al. . |
| Re. 34,255 | 5/1993 | Friedrich . |
| 2,890,868 | 6/1959 | Potchen . |
| 3,236,419 | 2/1966 | Remer et al. . |
| 3,361,412 | 1/1968 | Cole, III . |
| 3,749,378 | 7/1973 | Rhodes . |
| 3,800,985 | 4/1974 | Grout et al. . |
| 3,941,355 | 3/1976 | Simpson . |
| 4,059,714 | 11/1977 | Scholl et al. . |
| 4,135,882 | 1/1979 | Harkness et al. . |
| 4,323,474 | 4/1982 | Hansen et al. ............... 261/DIG. 26 |
| 4,371,096 | 2/1983 | Scholl et al. ............... 261/DIG. 26 |
| 4,396,529 | 8/1983 | Price et al. . |
| 4,511,258 | 4/1985 | Federighi et al. ............... 261/76 |
| 4,527,712 | 7/1985 | Cobbs, Jr. et al. . |
| 4,674,888 | 6/1987 | Carlson ............... 261/76 |
| 4,778,631 | 10/1988 | Cobbs, Jr. et al. . |
| 4,791,142 | 12/1988 | Pleuse et al. . |
| 4,850,705 | 7/1989 | Horner ............... 366/338 |
| 4,929,088 | 5/1990 | Smith . |
| 5,056,034 | 10/1991 | Rucki et al. . |
| 5,243,488 | 6/1995 | Filion et al. . |
| 5,356,565 | 10/1984 | Southwell ............... 261/DIG. 26 |

FOREIGN PATENT DOCUMENTS

| | | |
|---|---|---|
| 2208226 | 9/1973 | Germany ............... 366/338 |
| 2813879 | 4/1981 | Germany . |
| 1262468 | 2/1972 | United Kingdom . |
| 1418772 | 12/1975 | United Kingdom . |
| 1424161 | 2/1976 | United Kingdom . |
| 1441658 | 7/1976 | United Kingdom . |
| 8301395 | 4/1983 | WIPO ............... 261/DIG. 26 |

OTHER PUBLICATIONS

Streiff, F., "In–line Dispersion and Mass Transfer using Static Mixing Equipment", Sulzer Technical Review, (Koch Engineering Company), pp. 108–113, Mar., 1977.

Wilkinson, W. L. et al., "An Investigation into the Performance of A Static In–Line Mixer", Second European Conference on Mixing, Paper A2, Apr. 1977, pp. 15–29.

Brochure, Fiber Producer, "Koch Static Mixing", Apr. 1982.

Grosz–Röll, F., "Gas/Liquid Transfer with Static Mixing Units", Fourth European Conference on Mixing, Apr. 1982, pp. 225–236.

Brochure, "Static Mixing Technology", *Koch Engineering Company, Inc.*, Bulletin KSM–5, ©1986.

Rauwendaal, C., "A guide to static mixers", *Plastics World*, May 1992, pp. 63–65.

"Kenics HEV High Efficiency Static Mixer", *Chemineer*, Bulletin 811 (undated).

Catalog, "Motionless Mixers for Adhesives and Sealants", *TAH Industries, Inc.*, Catalog 108 (undated).

Schneider, G. et al. "Static Mixing of Adhesives, Silicone Compounds and Reactive Resins", European Adhesives and Sealants, Jun. 1987, pp. 4–6.

Schneider, R., "'Balancing' Automated Automotive Paint Systems", (undated).

Brochure, "Sizing the Cleveland Static Mixer", Cleveland Static Mixing Systems, (undated).

*Primary Examiner*—Tim R. Miles
*Attorney, Agent, or Firm*—Wood, Herron & Evans

[57] ABSTRACT

Methods and apparatus for producing high quality closed cell foams for use in applications such as coatings, sealant beads, seam filling and gaskets. An in-line single pass static mixing device containing a very large number of individual mixing elements is used to homogeneously disperse a gas throughout a highly viscous liquid polymeric material such as a plastisol, silicone, butyl or urethane based material.

31 Claims, 4 Drawing Sheets

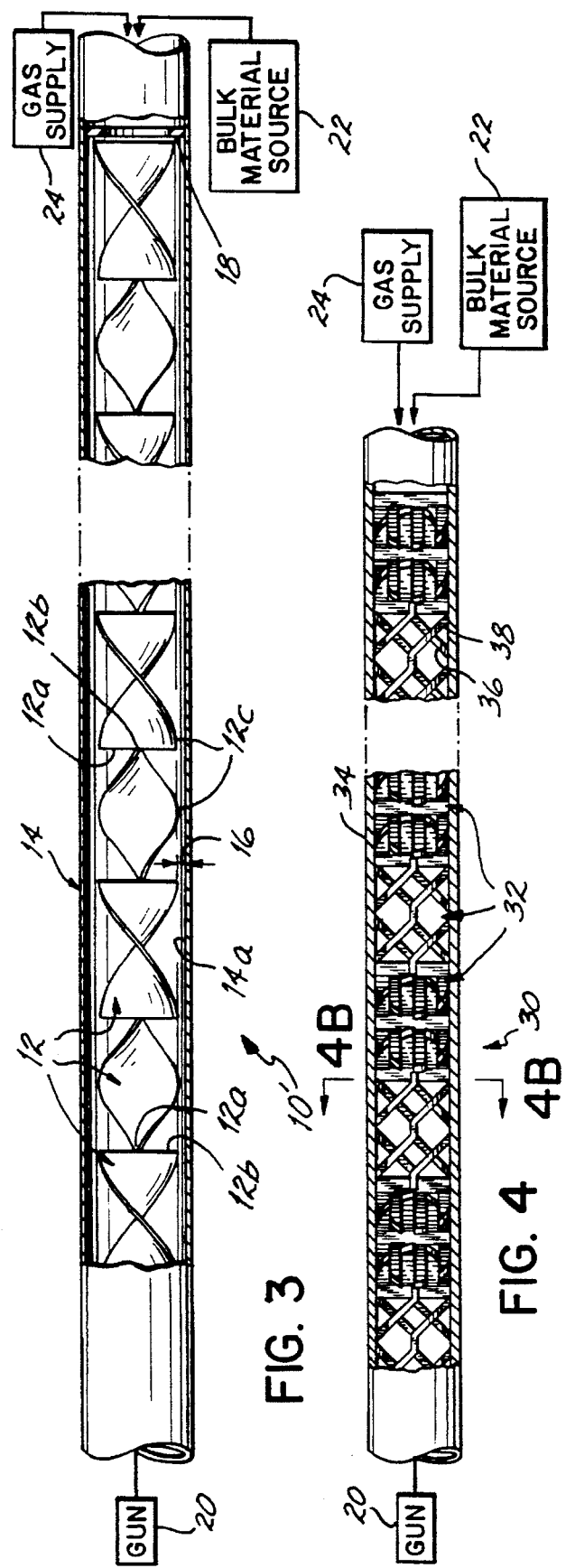

METHOD AND APPARATUS FOR PRODUCING CLOSED CELL FOAM

BACKGROUND OF THE INVENTION

The present invention relates to methods and apparatus for mixing a gas with a liquid polymeric material to produce a closed cell foam structure such as a foam coating or bead. More particularly, the invention is suitable for use with polymeric materials such as adhesives, sealants and caulks.

The types and quality of foamed polymeric material produced by the methods and apparatus of the present invention are generally similar to those produced by apparatus of the type disclosed in U.S. Pat. No. 4,778,631 (the '631 patent) issued to Cobbs, Jr. et al. and assigned to the assignee of the present invention. The apparatus disclosed in the '631 patent is a dynamic mixer which was developed to address the very difficult problem of homogeneously mixing two different materials having very divergent viscosities or, in other words, having an extremely high viscosity ratio. More specifically, it deals with the problem of homogeneously mixing a gas which essentially has a viscosity near zero ( $1.2 \times 10^{-6}$ lbs./ft.-sec.) with liquid polymers having viscosities ranging from about 2000 centipoise (cps) up to, for example, 1,000,000 cps to produce high quality closed cell foam. Although the dynamic mixer of the '631 patent also works very well with polymers having lower ranges of viscosities, it is disclosed as being especially useful and advantageous for mixing gas with liquid polymers having viscosities in the range of 50,000 cps to above 1,000,000 cps.

The dynamic mixer of the '631 patent produces a very high quality closed cell foam such as foamed plastisol which may be used to form a gasket or as a coating such as an auto body undercoating or as a bead for other sealing purposes. The "high quality" of the closed cell foam produced by the dynamic mixer of the '631 patent is characterized by the homogeneous dispersion of microbubbles of gas which remain trapped within the polymeric material after it has been dispensed from the mixer and has cured or set. Prior to the introduction of dynamic mixers of the type disclosed in the '631 patent, apparatus incorporating gear pumps had been utilized to foam so-called "hot melt" adhesives which range in viscosity from about 2,200 cps to 20,000-35,000 cps at the usual dispensing temperatures of about 350° F. to 400° F. One example of this type of apparatus is disclosed in U.S. Pat. No. 4,059,714 to Scholl et al.

The '631 patent addressed some of the shortcomings of gear pump mixers, especially with respect to the inability to obtain adequate mixing with polymers having viscosities above 50,000 cps, however, both gear pump mixers and dynamic mixers of the type disclosed in the '631 patent have significant drawbacks related to their cost effectiveness and practicality in certain applications. Most notably, these mixers are relatively bulky and complex in design due to their large number of precision moving parts. Therefore, they may be relatively difficult to set up especially where space considerations are a significant factor and, perhaps more importantly, are expensive to manufacture and therefore costly to the end user. Also, the cost of maintenance and repair remains high throughout the life of the mixers due to their relatively complex design.

Two other mixing devices designed to mix liquid polymers with gas are disclosed in U.S. Pat. No. 4,396,529 (the '529 patent) to Price et al. and U.S. Pat. No. 4,527,712 (the '712 patent) to Cobbs, Jr. et al., both being assigned to the assignee of the present invention. Like the above-mentioned patent to Scholl et al., the '529 patent concerns the foaming of hot melt liquid adhesives. Specifically, the '529 patent discloses a dispensing head including a static mixing means preferably comprising four baffle plates disposed directly upstream of the dispensing head discharge orifice. Pressurized gas is injected into a contact chamber containing pressurized liquid hot melt adhesive immediately upstream of the four baffle plates. As the liquid hot melt adhesive and gas are caused to flow through the baffle plates, the mixture is divided and then recombined to distribute the gas within the adhesive.

Although the device disclosed in the '529 patent performs satisfactorily when used in conjunction with many liquids, and specifically hot melt adhesives having much lower viscosities than the materials used in, for example, the dynamic mixer of the '631 patent mention above, testing has shown that higher viscosity liquid polymers having viscosities above about 3,000 cps cannot be formed into high quality foams with the dispensing head of the '529 patent. More specifically, when plastisols having viscosities on the order of 3,000 cps and above are run through the dispensing head disclosed in the '529 patent, inadequate dispersion of the gas within the plastisol results in low quality foam which is unsuitable for many applications. Thus, the dispensing head of the '529 patent is not suited for producing the high quality foamed polymeric material which is produced by the dynamic mixer of the '631 patent mentioned above.

In addition to the problems associated with attempting to produce high quality foam from high viscosity materials using apparatus of the type shown in the '529 patent, uneven gas distribution may result in certain liquids having even lower viscosities, e.g., in the range of about 2000–3000 cps. It is theorized that problems associated with the use of such lower viscosity materials may relate more to an inability of the material to hold gas in a homogeneous dispersion than to the viscosity of the material.

The '712 patent to Cobbs, Jr. et al. relates to methods and apparatus for dispensing foams or atomizable paints. More particularly, the '712 patent utilizes a combined heater and mixer to coincidentally heat and mix a gas and a liquid polymer. The heater/mixer is contained in a circulating loop which further includes a feed pump for force feeding liquid polymer into a metering block disposed at the inlet to the heater/mixer. The circulating loop also includes one or more dispensing guns and a recirculation pump for maintaining the system pressure in the loop. The metering block further receives a blowing agent or gas which is mixed with the liquid polymer in the heater/mixer. The heater/mixer is disclosed as including either a static mixer or a dynamic mixer. With specific regard to the static mixer alternative, a conventional static mixer formed with 21 elements of right and left-handed helices is disclosed.

Several disadvantages are associated with a recirculation type system with regard to the production of foams with highly viscous liquid polymers. Namely, the use of a circulation loop which necessitates both a feed pump and a recirculation pump increases the size and cost of the system as compared to systems which do not require such a loop. Moreover, the degree of mixing is strictly dependent on the ratio between the difference in flow rates through the heater/ mixer and the despensing gun or guns. In other words, to obtain better mixing the flow rate through the heater/mixer must be much higher than the flow rate through the dispensing gun or guns. Therefore, there must be a relatively high flow rate through the heater/mixer to achieve adequate mixing, however, the comparably low flow rate through the dispensing gun or guns causes the system to be inefficient and unusable in many applications. This is especially true in the case of highly viscous polymers which do not easily achieve high flow rates.

In view of the above noted problems in the prior art, there is a need for improvements in the formation of high quality closed cell foam from higher viscosity polymers, and specifically for improvements which increase the efficiency and cost effectiveness of producing such high quality closed cell foam.

SUMMARY OF THE INVENTION

To these ends, the present invention comprises methods and apparatus for producing high quality closed cell foams for use in applications such as bonding, coatings, sealant beads, seam filling, and gaskets. Specifically, with respect to non-newtonian fluids, the invention concerns forming these high quality closed cell foams from viscous polymers having viscosities in excess of about 1,000 cps and, more preferably, above about 3,000 cps. An in-line single pass static mixing device containing a very large number of individual mixing elements is used to homogeneously disperse a gas throughout a highly viscous liquid polymeric material such as a plastisol, silicone, butyl or urethane based material. One suitable urethane based material is sold under the trade name "Dynafoam" and may be used as a gasketing material. The specific number of mixing elements will vary according to the design of a particular mixer, but quite unexpectedly, a large number of in-line elements, in some cases numbering from about 4–8 times the number of identical elements utilized in conventional static mixer applications, produce high quality foam from highly viscous polymers in a wide range of flow rates through the mixer. The result is a closed cell foam which comprises a homogeneous dispersion or solution of similarly sized microbubbles of gas within a polymeric matrix. The present invention further allows variable density reductions of the polymer in desirable ranges such as between 30%–50%.

As used herein, the term "solution" describes the liquid polymer containing a dissolved gas supplied under high pressure to the static mixing device which creates a foamed polymeric structure when dispensed at atmospheric pressure. The term "solution" as used in the specification and claims of the application is intended to define and encompass the broader generic definition of "solution" which is a homogeneous mixture of a gas and a molten or liquid polymer, whether or not all of the gas molecules are in fact dissolved or dispersed among the polymer molecules, but where the gas is not present as a bubble in sizes which are equal to or larger than the polymer molecule size.

The invention more specifically comprises a pressurized bulk material source for force feeding highly viscous liquid polymer into either a rigid or flexible conduit containing a large number of static mixing elements. Gas at a pressure above the pressure of the polymer is also injected into the conduit upstream of the static mixer. A nozzle or dispensing gun is attached to the conduit downstream of the static mixer and may be designed according to specific application requirements to dispense the solution in the form of, for example, a bead or a spray coating. Specific applications of the present invention include those in which the dynamic mixer of the '631 patent is presently used such as auto body undercoating and soundproofing applications and other sealing applications such as gasket production.

In one preferred embodiment, the static mixer comprises at least approximately 90 conventional mixing elements taking the form of alternating right and left-handed helices substantially identical to those disclosed in the '712 patent. Most preferably, to enable the use of as few as approximately 90 such helical elements while still producing high quality foam, it has been found that the mixing elements should be, contrary to the prior art, received loosely by the conduit. That is, a gap should exist between the mixing elements and the inner wall of the mixer conduit. For example, static mixers of the present invention may comprise mixing elements having an outer diameter which is about 25% less than the inner diameter of the conduit. When such helical elements are received tightly by the conduit, that is, when there is little or no gap left between the inner wall of the conduit and the outer edges of the elements, it has been found that approximately twice the number of elements are necessary to obtain the same quality of foam with no "coughing" or "spitting" at the nozzle during the dispensing operation. "Coughing" and "spitting" occur as the result of relatively large gas bubbles forming in the solution of liquid polymer and gas. When these gas bubbles are discharged from an outlet nozzle, they disrupt the uniform output of foamed material.

Static mixing elements having designs other than the helical design of the elements mentioned above may be used in practicing the present invention, The required number of elements will vary according to the mixing efficiency of the chosen design, however, as determined through tests performed with several common designs, the required number in each case has been found to be significantly higher than the number used in prior conventional mixing applications utilizing such static mixers. As there can be a significant pressure drop across such a large number of static mixing elements, the pressure at which the polymer is force fed into the upstream end of the static mixer is chosen such that the pressure will not drop below a critical pressure at the nozzle which represents the minimum pressure necessary to dispense the solution in a particular application. The flow rate of the solution through the static mixer is dependent on factors such as the system pressure, the viscosity of the solution and particularly of the liquid polymer, and the number and design of the mixing elements.

Several advantages over the prior art are obtained by way of the present invention. For example, high quality closed cell foam coatings and beads may be applied using apparatus and methods of the present invention in many diverse applications while avoiding the relatively high costs associated with dynamic mixers currently in use. Specifically, due to the surprising finding that a relatively simple static mixing device constructed according to the present invention can be used to homogeneously mix gas into viscous liquid polymeric materials to form closed cell foams, major costs associated with the manufacture, repair, maintenance and clean-up of prior dynamic mixers used to produce many of the same closed cell foams, have been substantially reduced by the present invention. Further advantages of the present invention will become more readily apparent through the following detailed description taken in conjunction with the accompanying drawings and examples.

BRIEF DESCRIPTION OF THE DRAWINGS

FIG. 3 is a diagrammatic side view of a second embodiment of the invention illustrating an apparatus utilizing the mixing elements of FIG. 2 but showing such elements received loosely within the conduit;

FIG. 4 is a diagrammatic side view of a third embodiment of the invention illustrating a plurality of another illustrative type of static mixing element received within a conduit to form a static mixer, the figure being fragmented to imply a much larger number of elements than are actually shown

DETAILED DESCRIPTION OF THE PREFERRED EMBODIMENTS

Figure 1:
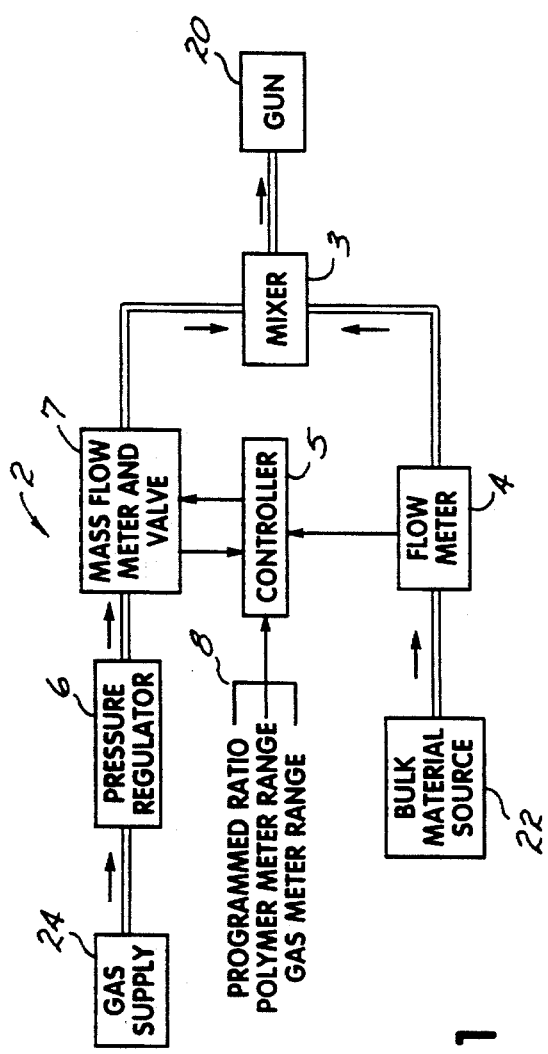
FIG. 1 is a block diagram of a foam mixing system which may use static mixing apparatus constructed in accordance with the present invention.

Referring to FIG. 1 a foam mixing system 2 is illustrated and comprises a suitable system in which the static mixing apparatus of the present invention may be incorporated. The general configuration of the system 2 is shown and described in more detail in U.S. Pat. No. 5,056,034 which is assigned to the assignee of the present invention and hereby expressly incorporated herein in its entirety. The system 2 controls gas and polymer flow to a static mixer 3 constructed according to the present invention, as further explained below. The static mixer 3 delivers a solution of the polymer and gas to a dispensing gun 20 after receiving and mixing liquid polymeric material and gas, respectively, from a bulk material source 22 and a gas supply 24. The system 2 further includes a digital flow meter 4, a controller 5 as well as a pressure regulator 6 and a mass flow meter and valve 7. The digital flow meter 4 produces output pulses to the controller 5 and the controller 5 further processes signals from the mass flow meter and valve 7 as detailed in U.S. Pat. No. 5,056,034. The controller 5 is a microprocessor based control device having a set of inputs 8 which accept settings from the operator including a setting for the programmed ratio of gas to polymer, the polymer meter range and the gas meter range.

Figure 2:
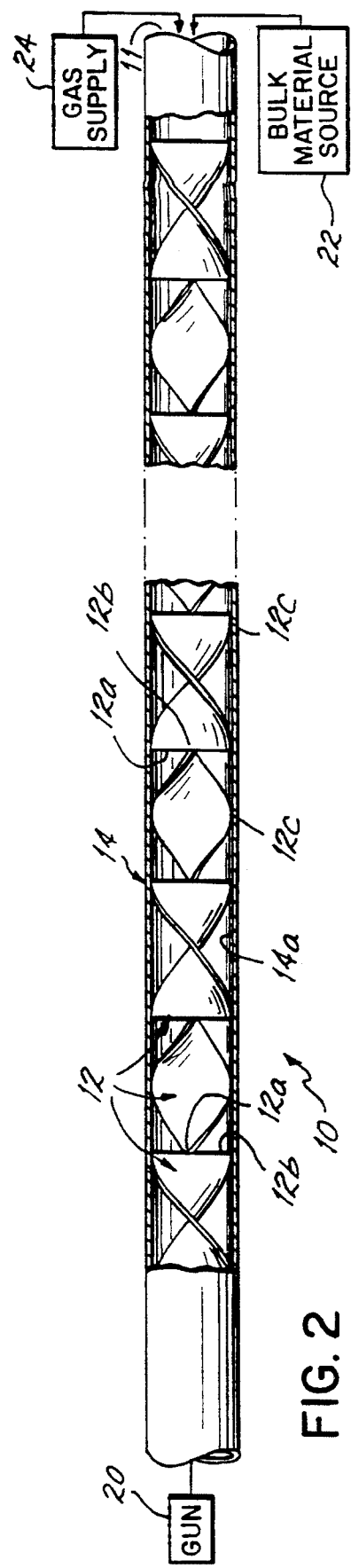
FIG. 2 is a diagrammatic side view of a first embodiment of the invention illustrating a plurality of one illustrative type of static mixing element received tightly within a conduit to form a static mixer, the figure being fragmented to imply a much larger number of elements than are actually shown.

Although the present invention may be practiced in many forms, the three illustrative foaming systems shown in FIGS. 2–4 demonstrate a basic set up of the invention. More particularly, FIG. 2 illustrates an apparatus 10 constructed according to a first embodiment and including a plurality of static mixing elements 12 received with a tight fit within a conduit 14, i.e., such that substantially no gap exists between the outermost edges or points 12c of the elements 12 and the inner wall 14a of the conduit 14. The static mixing elements 12 in this illustrative embodiment are formed in a conventional manner as alternating right and left-handed helices comprising curved flat elements extending longitudinally within the conduit 14. Each element 12 has a curvature to turn the direction of material flow through the conduit 14. Leading and trailing edges 12a and 12b, respectively, of adjacent elements 12 are disposed at a substantial angle to each other with the preferred angle being 90° C. Elements of this type may be obtained from various manufacturers such as Kenics Corporation. The series of elements 12 as well as the conduit 14 have been broken away in FIG. 2 such that only a very small portion of the actual number of elements 12 and only a very small portion of the length of the conduit 14 is shown. To obtain high quality closed cell foam, the actual minimum number of elements 12 having a helical design similar to that shown in FIGS. 2 and 3 is at least about 90 for a material such as plastisol with the best results being obtained with at least between 150 to 200 elements as will be further detailed in the description and examples to follow. The exact number of elements will vary dependent upon the material to be foamed.

The elements 12 of both embodiments are preferably physically connected to one another at their adjacent leading and trailing edges 12a, 12b in groups of predetermined numbers such as by being molded together, for example, in groups of ten. With respect to the adjacent elements 12 which are not physically connected to one another, to maintain good mixing these elements 12 are preferably placed within the conduit 14 such that the leading edge 12a of one touches the trailing edge 12b of the next. The conduit 14 may be either rigid or flexible in nature. If the conduit 14 is flexible, the use of separate groups of connected elements helps allow the conduit 14 to flex if necessary, for example, during a dispensing operation.

One end of the conduit 14 may be connected to a dispensing gun 20 while the opposite end of the conduit 14 is operatively connected to a pressurized bulk material source 22 which includes a pump for force feeding polymeric material into the conduit 14. The dispensing gun 20 shown in FIGS. 1–4 may, of course, take many different forms depending on the particular needs of an application. For example, dispensing guns or nozzles may be used which produce various spray patterns or beads. Gas is fed into the conduit 14 from a gas supply 24 which injects gas into the conduit 14, preferably in a co-axial manner. For plastisols and urethanes such as Dynafoam, the polymer should be supplied at a pressure equal to or greater than 1000 psi and preferably at a pressure of between about 1400 psi and about 3000 psi. For silicones, good foamed products have been obtained at supply pressures of 1000 psi, but it is believed that good results may also be obtained at supply pressures of 700 psi or greater. The gas may be supplied at a pressure of about 100 psi higher than the pressure of the polymer so that backflow of polymer does not enter the gas inlet. Preferably, a check valve (not shown) is connected between the gas supply 24 and the inlet end 11 of the conduit 14 to prevent such backflow of polymer.

A second embodiment of the invention is illustrated in FIG. 3 in which like elements of the first and second embodiments are represented by like reference numerals. Specifically, the apparatus 10' of the second embodiment includes a plurality of mixing elements 12 received by a conduit 14. The elements 12 are constructed with a helical design identical to that of the first embodiment. The basic difference between the first and second embodiments is that the elements 12 and the conduit 14 are sized such that a gap 16 exists between the outermost edges or points 12c of the elements 12 and the inner wall 14a of the conduit 14. With the elements 12 centered within the conduit 14, gap 16 may be approximately 10–30% of the inner radius of the conduit 14. In other words, the outer diameter of the elements 12 may be 70–90% of the inner diameter of the conduit 14. In the examples to follow, the conduit 14 had an inner diameter of 0.493" and the elements 12 had an outer diameter of 0.370" to create a differential of 0.123". In the examples utilizing the mixer of FIG. 2 gap 16 was therefore 0.0615" or about 25% of the inner radius of the conduit 14. A press fit washer or other inner flange member 18 is provided at the trailing end of the entire series of static mixing elements 12 to hold the static mixing elements 12 within the conduit 14. Apparatus 10'further comprises a dispensing gun 20, bulk material source 22, and a gas supply 24 which, for example, comprise components in the foam dispensing system 2 illustrated in FIG. 1.

Figure 4A:
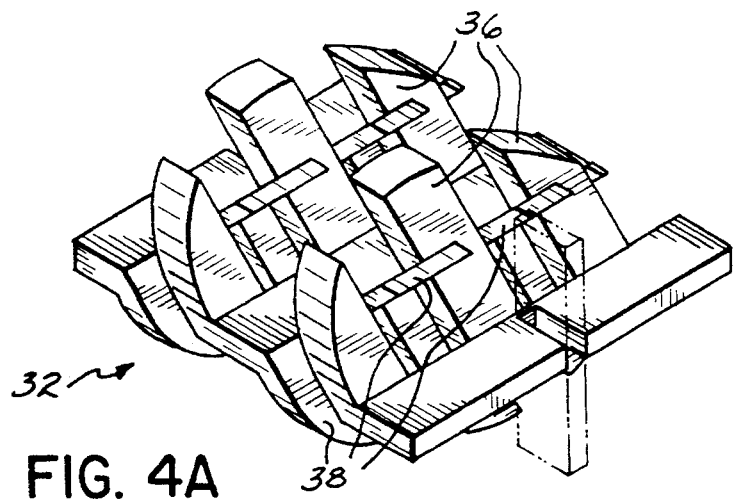
FIG. 4A is a perspective view of a static mixing element taken from the mixer of FIG. 4.
Figure 4B:
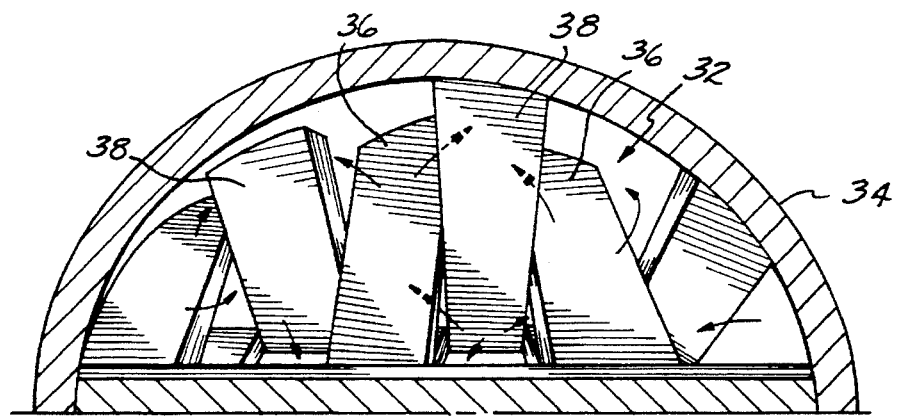
FIG. 4B is a cross section in perspective generally taken along line 4B—4B of FIG. 4 with arrows representing fluid flow therethrough.

FIG. 4 illustrates an apparatus 30 constructed according to a third embodiment of the present invention. Apparatus 30 comprises a plurality of static mixing elements 32 contained within a conduit 34. Like the static mixing elements 12 of the first embodiment, and as apparent from FIGS. 4A and 4B, elements 32 are generally circular in cross-section and are received with a "tight" fit in conduit 34. Elements 32 are formed of bars 36, 38 intersecting at 45° C. to the longitudinal axis of conduit 34. Adjacent elements 32 are rotated 90° C. with respect to each other about the longitudinal axis of conduit 34. Preferably, adjacent elements 32 are physically connected to each other, as by welding, in predetermined numbers or groups, such as groups of two. Elements 32 are sold by Koch Engineering Co., Inc. under the name SMX™. Conduit 34 may be rigid or flexible in nature and, if flexible, the use of separate groups of connected elements helps allow conduit 34 to flex during a dispensing operation.

Like the illustrations in FIGS. 2 and 3, the series of elements 32 as well as the conduit 34 have been broken away in FIG. 4 such that only a small portion of the actual number of elements 32 and only a small portion of the length of conduit 34 is shown. To obtain high quality closed cell foam, the actual minimum number of elements having an intersecting bar design similar to that shown in FIG. 4 is at least about 30 with some better results being obtained using more than 40 elements. Once again, the exact number of elements will vary dependent on the material being foamed.

As in the first two embodiments, one end of conduit 34 is preferably connected to a dispensing gun 20 while the opposite end is connected to a pressurized bulk material source 22 for force feeding polymeric material into conduit 34. Also, pressurized gas from a gas supply 24 is injected coaxially into conduit 34. For plastisols and urethanes such as Dynafoam, the polymer should be supplied at a pressure greater than 1000 psi and preferably at a pressure of between about 1400 psi and about 3000 psi. The gas is supplied at a pressure of about 100 psi higher than the polymer supply pressure unless a check valve is used as explained with respect to the first two embodiments.

The basic operation of all three embodiments of the present invention, shown respectively in FIGS. 2–4, is the same and will therefore only be described with respect to FIG. 2. Liquid polymeric material such as plastisol is force fed into the inlet end 11 of the conduit 14 by the pressurized bulk material source 22 at a pressure above 1000 psi and preferably in the range of 1400 psi-3000 psi. At the same time, gas such as air is force fed into the inlet end 11 of the conduit 14 whereupon the solution of gas and liquid polymeric material is forced through the conduit 14 (to the left as viewed in FIG. 2) and through the static mixing elements 12 which continuously divide the gas and polymeric material until the gas is dispersed homogeneously throughout the liquid polymer in the form of microbubbles. The solution of gas and polymeric material is then dispensed from the gun 20 and foams as it contacts a substrate. A high quality closed cell foam is thus produced in a form consistent with the type of dispensing gun 20 used in a particular application.

Although the accompanying figures show the orientation of the mixer to be one in which the static mixing elements and flow of the solution are oriented horizontally, this particular orientation is not critical. The mixer could be disposed, for example, on a vertical axis with either the upstream or downstream end at the higher elevation or in any orientation therebetween since the polymer/gas solution fills the interior of the conduit.

In the static mixing art, the degree to which two materials are mixed is sometimes expressed in terms of the theoretical number of layers formed by the mixing elements. Manufacturers of static mixing elements generally supply a formula for determining the theoretical number of layers that will be produced with a given number of a particular mixing element. Of course, the number of static mixing elements required in the present invention will vary according to the theoretical "mixing efficiency" of the particular mixing element with a greater number of elements generally being required when using elements having lower mixing efficiencies and a lesser number of elements being required when using elements having higher relative mixing efficiencies. However, testing and resulting calculations based on mixing elements of various designs and mixing efficiencies has unexpectedly shown that at least about $10^{27}$ theoretical layers are necessary to produce high quality foam by mixing gas with viscous polymeric liquids such as adhesives, sealants and caulks. Illustrative examples of such calculations are given below.

The helical mixing elements 12 shown in FIGS. 2 and 3 will theoretically divide fluid flow into a number of layers according to the formula: where "n" is the number of elements 12. Therefore, 90 such elements will theoretically divide flow into approximately $10^{27}$ layers according to the above formula.

Another static mixer, Ross type ISG, illustrated in FIGS. 5, 6A, 6B, 7A, 7B, 8A and 8B, is somewhat more efficient in terms of the number of layers produced per element and divides flow into a number of layers according to the formula:

$$2^n(4)$$

where "n" is again the number of elements. Using the Ross mixing elements, 90 elements will therefore divide flow into approximately $5 \times 10^{27}$ layers.

Figure 5:
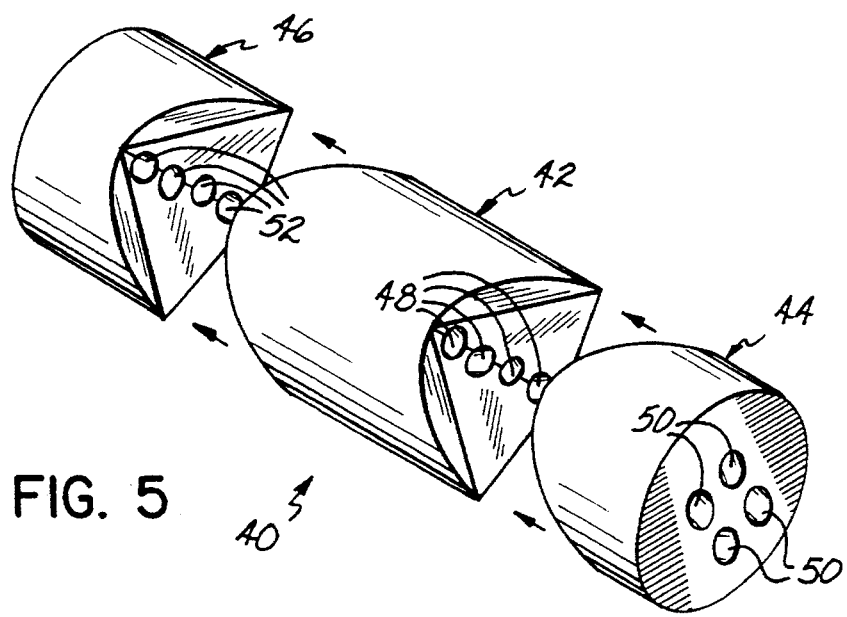
FIG. 5 is a perspective view illustrating a third alternative static mixer which may be used in the present invention.
Figure 8A:
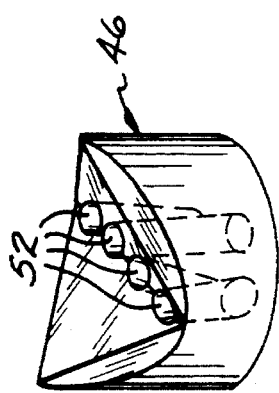
Figure 8B:
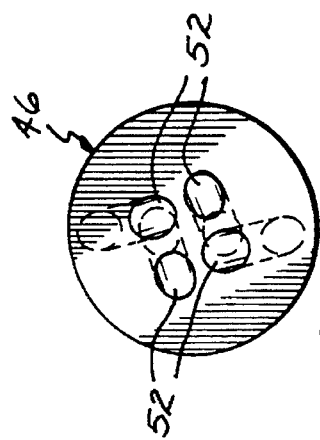
Figure 7A:
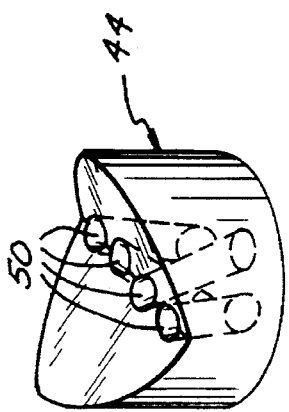
FIGS. 7A and 7B are similar views to those respectively shown in FIGS. 6A and 6B but illustrating one of the end elements of FIG. 5; and, FIGS. 8A and 8B are similar views respectively to FIGS. 7A and 7B but illustrating the other end element of FIG. 5.
Figure 7B:
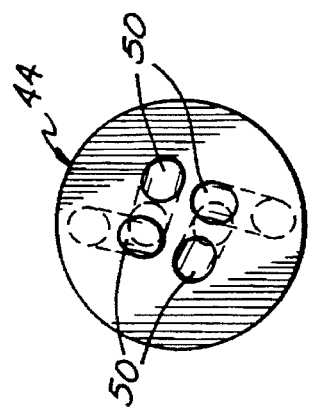
Figure 6A:
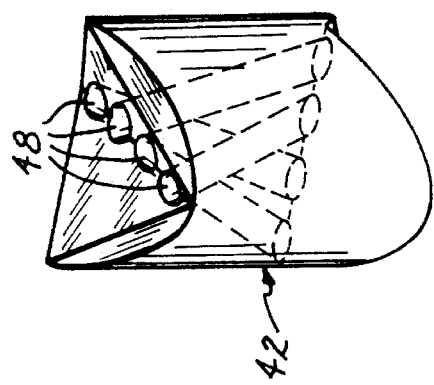
FIG. 6A is a perspective view of the middle or intermediate mixing element shown in FIG. 5 and illustrating the configuration of passageways through the element.
Figure 6B:
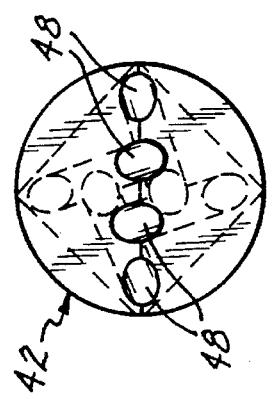
FIG. 6B is a bottom view of the mixing element shown in FIG. 6A and further illustrating the configuration of passageways through that elements.

As shown in FIG. 5, the Ross-type ISG mixture comprises mixing elements 42, 44, 46 with elements 44 and 46 being end elements and element 42 being an intermediate element. As appreciated from Example 4 below, there will be many intermediate elements 42 received within a conduit and between end elements 44, 46. Each element 42, 44, 46 includes four passages configured to mix liquid as it flows through mixer 40. Intermediate element 42 contains passages 48 and end elements 44, 46 each respectively include passages 50, 52. The configuration of passages 48, 50, 52 are best illustrated, respectively, in FIGS. 6A and 6B, 7A and 7B, and 8A and 8B. It will be appreciated that the configuration and arrangement of passages 48 in intermediate element 42 serves to mix any liquid flowing through a plurality of such elements 42 by directing the liquid within a given passage from an outside or peripheral portion of the element on one side thereof to an inside or central portion of the element 42 on the other side.

The static mixer shown in FIG. 4 and sold by Koch Engineering Co., Inc. under the name SMX™ is still more efficient in terms of the number of layers produced per element and divides flow into a number of layers according to the formula:

$$16^{n/2}$$

where "n" is again the number of elements. With the Koch mixing elements, just 23 elements are therefore needed to divide flow into approximately $2.5 \times 10^{27}$ layers.

EXAMPLES

Apparatus

The Examples given below were performed with static mixing apparatus configured substantially as shown in FIGS. 2, 3 or 4, however, Ross mixing elements of the type mentioned above were utilized in Example 4. Apparatus as shown in FIG. 2 having helical mixing elements with a "tight" fit within a conduit was utilized in Examples 1 and 9 while apparatus as shown in FIG. 3 having helical mixing elements with a "loose" fit was utilized in Examples 2, 3, 7 and 10. The Ross mixing elements as well as the Koch mixing elements, shown in FIG. 4, were both used in the corresponding examples below in conduits with a "tight" fit.

The static mixers were all used in a system generally corresponding to the diagrammatic illustration of FIG. 1. In this regard, a FoamMix™ Series 9400 processor, manufactured by Nordson Corp. of Westlake, Ohio, and assignee of the present invention, was used as the controller. Using this controller, a gas ratio index value is programmed into the system and corresponds to a theoretical density reduction of the polymer. Specifically, the theoretical density reduction is eight times the gas ratio index value. For example, ratio settings of 2.0 and 4.0, as used in the examples to follow, correspond to respective theoretical density reductions of 16% and 32%. As further demonstrated below, actual density reduction will often differ from theoretical.

The conduits used in each of the Examples were formed of stainless steel. The conduit used in the "tight" fit Examples utilizing helical mixing elements had a 0.540" outer diameter and a 0.506" inner diameter. The helical static mixing elements used in the "tight" fit Examples had an outer diameter of 0.495". The conduit used in the "loose" fit Examples had a 0.675" outer diameter and a 0.493" inner diameter. The static mixing elements used in the loose fit examples had an outer diameter of 0.370". The conduit used in the Example utilizing Ross mixing elements had a 1.25" outer diameter and a 1.010" inner diameter. The Ross static mixing elements had an outer diameter of 0.970". The conduit used in the Example utilizing Koch mixing elements had a 0.675" outer diameter and a 0.502" inner diameter. The Koch static mixing elements had an outer diameter of 0.480". In all Examples a nozzle was used to dispense a bead of closed cell foam.

Example 1

The apparatus shown in FIG. 2 of the drawings having the physical parameters described above was operated for foaming plastisol (No. ESBM4G252-B) sold by Coat-It Co. The plastisol was supplied to the inlet of the mixer at room temperature and at a pressure of 3000 psi and a flow rate of 700 ccpm. Gas in the form of air was supplied at room temperature and at a pressure just above 3000 psi through a check valve connected to the gas inlet of the mixer. The gas ratio index value was programmed at 2.0. There were 198 static mixing elements received tightly by the conduit. The pressure drop across the mixer was 678 psi and the nozzle pressure was 543 psi. The flow rate at the nozzle was 820 ccpm and the resulting product flowing from the nozzle was a continuous, creamy, very homogenous foam with small bubbles contained therein. The density reduction of the foamed plastisol obtained with this apparatus was approximately 37%. There was no "coughing" or "spitting" observed at the nozzle.

Example 2

The apparatus shown in FIG. 3 of the drawings having the physical parameters described above was operated for foaming the plastisol used in Example 1. The plastisol was supplied to the inlet of the mixer at room temperature and at a pressure of 2200 psi and a flow rate of 700 ccpm. Gas in the form of air was supplied at room temperature and at a pressure just above 2200 psi through a check valve connected to the gas inlet of the mixer. The gas ratio index value was programmed at 2.0. There were 96 static mixing elements received loosely by the conduit. The pressure drop across the mixer was 189 psi and the nozzle pressure was 732 psi. The flow rate at the nozzle was 733 ccpm and the resulting product flowing from the nozzle was a continuous, creamy, very homogenous foam with small bubbles contained therein. The density reduction of the foamed plastisol obtained with this apparatus was approximately 36%. There was no "coughing" or "spitting" observed at the nozzle.

Example 3

The apparatus shown in FIG. 3 of the drawings having the physical parameters described above was operated for foaming the plastisol used in Example 1. The plastisol was supplied to the inlet of the mixer at room temperature and at a pressure of 1400 psi and a flow rate of 1200 ccpm. Gas in the form of air was supplied at room temperature and at a pressure just above 1400 psi through a check valve connected to the gas inlet of the mixer. The gas ratio index value was programmed at 4.0. There were 192 static mixing elements received loosely by the conduit. The pressure drop across the mixer was 360 psi and the nozzle pressure was 404 psi. The flow rate at the nozzle was 1232 ccpm and the resulting product flowing from the nozzle was a continuous, creamy, very homogenous foam with small bubbles contained therein. The density reduction of the foamed plastisol obtained with this apparatus was approximately 51%. There was no "coughing" or "spitting" observed at the nozzle.

Example 4

An apparatus substantially as shown in FIG. 2 but utilizing Ross mixing elements as described above was operated for foaming the plastisol used in Example 1. The plastisol was supplied to the inlet of the mixer at room temperature and at a pressure of 3000 psi and a flow rate of 700 ccpm. Gas in the form of air was supplied at room temperature and at a pressure just above 3000 psi through a check valve connected to the gas inlet of the mixer. The gas ratio index value was programmed at 4.0. There were 120 static mixing elements received tightly by the conduit. The pressure drop across the mixer was 790 psi. The flow rate at the nozzle was 849 ccpm and the resulting product flowing from the nozzle was a continuous, creamy, very homogenous foam with small bubbles contained therein. The density reduction of the foamed plastisol obtained with this apparatus was approximately 39%. There was no "coughing" or "spitting" observed at the nozzle.

Example 5

An apparatus as shown in FIG. 4 was operated for foaming the plastisol used in Example 1. The plastisol was supplied to the inlet of the mixer at room temperature and at a pressure of 3000 psi and a flow rate of 700 ccpm. Gas in the form of air was supplied at room temperature and at a pressure just above 3000 psi through a check valve connected to the gas inlet of the mixer. The gas ratio index value was programmed at 4.0. There were 42 static mixing elements received tightly by the conduit. The pressure drop across the mixer was 280 psi. The flow rate at the nozzle was 930 ccpm and the resulting product flowing from the nozzle was a continuous, creamy, very homogenous foam with small bubbles contained therein. The density reduction of the foamed plastisol obtained with this apparatus was approximately 37%. There was no "coughing" or "spitting" observed at the nozzle.

Example 6

An apparatus as shown in FIG. 4 was operated for foaming the plastisol used in Example 1. The plastisol was supplied to the inlet of the mixer at room temperature and at a pressure of 2200 psi and a flow rate of 700 ccpm. Gas in the form of air was supplied at room temperature and at a pressure just above 2200 psi through a check valve connected to the gas inlet of the mixer. The gas ratio index value was programmed at 2.0. There were 30 static mixing elements received tightly by the conduit. The pressure drop across the mixer was 234 psi. The flow rate at the nozzle was 870 ccpm and the resulting product flowing from the nozzle was a continuous, creamy, very homogenous foam with small bubbles contained therein. The density reduction of the foamed plastisol obtained with this apparatus was approximately 27%. There was no "coughing" or "spitting" observed at the nozzle.

Example 7

The apparatus shown in FIG. 3 of the drawings having the physical parameters described above was operated for foaming DOW 732 Aluminum Silicone RTV. The silicone was supplied to the inlet of the mixer at room temperature and at a pressure of 1180 psi and a flow rate of 88 ccpm. Gas in the form of $N_2$ was supplied at room temperature and at a pressure just above 1180 psi through a check valve connected to the gas inlet of the mixer. The gas ratio index value was programmed at 6.0. There were 192 helical mixing elements received loosely by the conduit. The pressure drop across the mixer was 930 psi. The resulting product flowing from the nozzle was a continuous, creamy, very homogenous foam with small bubbles contained therein. The density reduction of the foamed silicone obtained with this apparatus was approximately 48%. There was no "coughing" or "spitting" observed at the nozzle.

Example 8

An apparatus as shown in FIG. 4 was operated for foaming DOW 732 Aluminum Silicone RTV. The silicone was supplied to the inlet of the mixer at room temperature and at a pressure of 1411 psi and a flow rate of 220 cccpm. Gas in the form of $N_2$ was supplied at room temperature and at a pressure just above 1411 psi through a check valve connected to the gas inlet of the mixer. There were 32 mixing elements received tightly by the conduit. The gas ratio index value was programmed at 8.0. The pressure drop across the mixer was 802 psi. The resulting product flowing from the nozzle was a continuous, creamy, very homogenous foam with small bubbles contained therein. The density reduction of the foamed silicone obtained with this apparatus was approximately 53%. There was no "coughing" or "spitting" observed at the nozzle.

Example 9

The apparatus shown in FIG. 2 of the drawings having the physical parameters described above was operated for foaming the plastisol used in Example 1. The plastisol was supplied to the inlet of the mixer at room temperature and at a pressure of 600 psi and a flow rate of 700 ccpm. Gas in the form of air was supplied at room temperature and at a pressure just above 600 psi through a check valve connected to the gas inlet of the mixer. The gas ratio index value was programmed at 2.0. There were 102 static mixing elements received tightly by the conduit. The pressure drop across the mixer was 220 psi and the nozzle pressure was 17.4 psi. The flow rate at the nozzle was 704 ccpm and the density reduction of the foamed plastisol obtained with this apparatus was approximately 25%. There was an abundance of "coughing" or "spitting" observed at the nozzle which led to nonuniform output of foamed plastisol. The less satisfactory results of this example were attributed to both the relatively low input pressure of the plastisol to the mixer and an insufficient number of tightly received mixing elements in the conduit.

Example 10

The apparatus shown in FIG. 3 of the drawings having the physical parameters described above was operated for foaming the plastisol used in Example 1, The plastisol was supplied to the inlet of the mixer at room temperature and at a pressure of 2200 psi and a flow rate of 1200 ccpm, Gas in the form of air was supplied at room temperature and at a pressure just above 2200 psi through a check valve connected to the gas inlet of the mixer. The gas ratio index value was programmed at 4.0. There were 96 static mixing elements received loosely by the conduit. The pressure drop across the mixer was 169 psi and the nozzle pressure was 1540 psi. The flow rate at the nozzle was 1100 ccpm and the density reduction of the foamed plastisol obtained in this example was approximately 46%. There was slight nonuniformity to the output stream observed at the nozzle.

Example 11

An apparatus as shown in FIG. 4 was operated for foaming the plastisol used in Example 1. The plastisol was supplied to the inlet of the mixer at room temperature and at a pressure of 2200 psi and a flow rate of 700 ccpm. Gas in the form of air was supplied at room temperature and at a pressure just above 2200 psi through a check valve connected to the gas inlet of the mixer. The gas ratio index value was programmed at 4.0. There were 12 static mixing elements received tightly by the conduit. The pressure drop across the mixer was 70 psi. The pressure at the nozzle was 450 psi and the flow rate at the nozzle was 733 ccpm. The density reduction of the foamed plastisol obtained in this example was approximately 40%. There was an abundance of "coughing" or "spitting" observed at the nozzle which created unsatisfactory nonuniformities in the output. This was attributed mainly to the insufficient number of elements used in the mixer.

Example 12

An apparatus as shown in FIG. 4 was operated for foaming the plastisol used in Example 1. The plastisol was supplied to the inlet of the mixer at room temperature and at a pressure of 1400 psi and a flow rate of 700 ccpm. Gas in the form of air was supplied at room temperature and at a pressure just above 1400 psi through a check valve connected to the gas inlet of the mixer. The gas ratio index value was programmed at 2.0. There were 30 static mixing elements received tightly by the conduit. The pressure drop across the mixer was 175 psi. The flow rate at the nozzle was 615 ccpm. The density reduction of the foamed plastisol obtained in this example was approximately 18%. There was slight "coughing" or "spitting" observed at the nozzle which created slight nonuniformities in the output. The relatively low density reduction and the slight nonuniformities in the output were attributed mainly to having a marginally satisfactory number of elements in the mixer.

From the description and examples given above, those of ordinary skill in the art will readily recognize other embodiments falling within the scope of the appended claims.

What is claimed is:

1. Apparatus for mixing gas with viscous polymeric material within a conduit to produce a closed cell foam, said apparatus comprising:

a pump for delivering said polymeric material at a pressure through said conduit;

a pressurized gas supply connected to said conduit for injecting pressurized gas into said polymeric material within said conduit downstream of said pump; and, a static mixer for mixing said gas into a homogeneous solution within said polymeric material, said static mixer having inlet and outlet ends and being contained in a conduit downstream of both said pump and said gas supply, said static mixer further comprising at least about 90 curved flat elements extending longitudinally within said conduit, each element having a curvature to turn the direction of material flow through said conduit, and wherein leading and trailing edges of adjacent elements are disposed at a substantial angle to each other.

2. The apparatus of claim 1 wherein said elements are received by said conduit such that a gap exists between outside edges of said elements and an inner wall of said conduit.

3. The apparatus of claim 2 wherein an outer diameter of said elements is approximately 70–90% of an inner diameter of said conduit.

4. The apparatus of claim 3 wherein the outer diameter of said elements is approximately 75% of the inner diameter of said conduit.

5. The apparatus of claim 2 wherein said static mixer further comprises at least approximately 150 elements.

6. Apparatus for mixing gas with viscous polymeric material within a conduit to produce a closed cell foam, said apparatus comprising:

a pump for delivering said polymeric material at a pressure through said conduit;

means for injecting pressurized gas into said polymeric material within said conduit downstream of said pump; and, a static mixer for mixing said gas into a homogeneous solution within said polymeric material, said static mixer having inlet and outlet ends and being contained within said conduit downstream of both said pump and said means for injecting pressurized gas, said static mixer further comprising a plurality of static mixing elements, said elements having a theoretical mixing efficiency defined by a formula for determining a theoretical number of layers that said mixer will divide fluid flow into based on a given number of said elements, wherein said mixer comprises a number of said elements sufficient to divide said mixture, according to said formula, into at least about $10^{27}$ layers in a single pass through said mixer to create a solution of said gas and said polymeric material.

7. The apparatus of claim 6 wherein said mixing elements have a theoretical mixing efficiency defined by the formula $2^n$ wherein "n" is the number of mixing elements.

8. The apparatus of claim 6 wherein said mixing elements have a theoretical mixing efficiency defined by the formula $2^n(4)$ wherein "n" is the number of mixing elements.

9. The apparatus of claim 6 wherein said mixing elements have a theoretical mixing efficiency defined by the formula $16^n/2$ wherein "n" is the number of mixing elements.

10. The apparatus of claim 6 wherein said elements are received by said conduit such that a gap exists between outside edges of said elements and an inner wall of said conduit.

11. The apparatus of claim 10 wherein an outer diameter of said elements is approximately 70–90% of an inner diameter of said conduit.

12. The apparatus of claim 11 wherein the outer diameter of said elements is approximately 75% of the inner diameter of said conduit.

13. Apparatus for mixing gas with viscous polymeric material within a conduit to produce a closed cell foam, said apparatus comprising:

a pump for delivering said polymeric material at a pressure through said conduit;

means for injecting pressurized gas into said polymeric material within said conduit downstream of said pump; and, a static mixer for mixing said gas into a homogeneous solution within said polymeric material, said static mixer having inlet and outlet ends and being contained within said conduit downstream of both said pump and said means for injecting pressurized gas, said static mixer further comprising at least about 30 mixing elements extending along a longitudinal axis of said conduit, wherein each mixing element is comprised of a plurality of bars intersected at 45° C. to the longitudinal axis of said conduit and adjacent elements being rotated 90° with respect to each other.

14. The apparatus of claim 13 wherein said static mixer further comprises at least approximately 40 mixing elements.

15. An apparatus for mixing a gas with polymeric material comprising an adhesive, sealant or caulk to produce a closed cell foam, said apparatus comprising:

means for supplying said polymeric material from a source thereof at an inlet pressure of at least about 1000 psi;

means for injecting said gas into the polymeric material;

a dispensing outlet;

a conduit coupled to said dispensing outlet and said means for injecting gas, said conduit having a plurality of static mixing elements therein of sufficient quantity to produce a homogeneous solution of said polymeric adhesive, sealant or caulk, such that upon dispensing said solution from said dispensing outlet a density reduction of said polymeric adhesive, sealant or caulk of at least about 30% is obtained; and, wherein said static mixing elements have a mixing efficiency defined by a predetermined formula for determining a theoretical number of layers that said mixer will divide fluid flow into based on a given number of said elements, wherein said mixer comprises a number of said elements sufficient to divide said mixture, according to said predetermined formula, into at least about $10^{27}$ layers in a single pass through said mixer to create a solution of said gas and said polymeric material.

16. The apparatus of claim 15 wherein said mixing elements have a theoretical mixing efficiency defined by the formula $2^n$ wherein "n" is the number of mixing elements.

17. The apparatus of claim 15 wherein said mixing elements have a theoretical mixing efficiency defined by the formula $2^n(4)$ wherein "n" is the number of mixing elements.

18. The apparatus of claim 15 wherein said mixing elements have a theoretical mixing efficiency defined by the formula $16^n/2$ wherein "n" is the number of mixing elements.

19. An apparatus for mixing a gas with polymeric material comprising an adhesive, sealant or caulk to produce a closed cell foam, said apparatus comprising:

means for supplying said polymeric material from a source thereof at an inlet pressure of at least about 1000 psi;

means for injecting gas into the polymeric material;

a dispensing outlet; and, a conduit coupled to said dispensing outlet and said means for injecting gas, said conduit having a plurality of static mixing elements therein of sufficient quantity to produce a homogeneous solution of said polymeric adhesive, sealant or caulk, such that upon dispensing said solution from said dispensing outlet a density reduction of said polymeric adhesive, sealant or caulk of at least about 30% is obtained and wherein said elements are received by said conduit such that a gap exists between outside edges of said elements and an inner wall of said conduit.

20. A method of producing a closed cell foam by mixing gas into homogeneous dispersion within a liquid polymeric material having a viscosity above approximately 2,000 cps, the method comprising the steps of:

force feeding said polymeric material to an inlet end of a static mixer at a pressure;

injecting a pressurized gas into said polymeric material upstream of said inlet end of said static mixer to create a mixture of said gas and said polymeric material; and, directing said mixture in a single pass through an in-line static mixer until the mixture has been divided into at least about $10^{27}$ layers, as determined by a theoretical mixing efficiency formula of said mixer, thereby creating a solution of said gas and said polymeric material.

21. The method of claim 20 wherein the step of delivering said polymeric material further comprises delivering a polymeric material selected from the group consisting of plastisols, silicones, butyls and urethanes.

22. The method of claim 20 wherein said polymeric material is force fed to the inlet of said static mixer at a pressure above approximately 1,000 psi.

23. The method of claim 20 wherein said polymeric material has a viscosity above approximately 10,000 cps.

24. A method of producing a closed cell foam by mixing gas into a homogeneous dispersion within a liquid polymeric material having a viscosity of at least approximately 2,000 cps, the method comprising the steps of:

delivering said polymeric material to a conduit at a pressure;

injecting a pressurized gas into said polymeric material within said conduit to create a mixture of said gas and said polymeric material; and, directing said mixture through at least about 90 mixing elements of a static mixer contained within said conduit, wherein said mixing elements comprise a series of curved, flat elements extending longitudinally within said conduit, each element having a curvature to turn the direction of material flow through said conduit, and wherein leading and trailing edges of adjacent elements are disposed at a substantial angle to each other.

25. The method of claim 24 wherein the step of delivering said polymeric material further comprises delivering a polymeric material selected from the group consisting of plastisols, silicones, butyls and urethanes.

26. The method of claim 24 wherein said polymeric material is force fed to the inlet of said static mixer at a pressure above approximately 1,000 psi.

27. The method of claim 24 wherein said polymeric material has a viscosity above approximately 10,000 cps.

28. A method of producing a closed cell foam by mixing gas into a homogeneous dispersion within a liquid polymeric material having a viscosity of at least approximately 2,000 cps, the method comprising the steps of:

delivering said polymeric material to a conduit at a pressure;

injecting a pressurized gas into said polymeric material within said conduit to create a mixture of said gas and said polymeric material; and, directing said mixture through at least about 30 mixing elements of a static mixer contained within said conduit, wherein said mixing elements extend along a longitudinal axis of said conduit and comprise a plurality of bars intersected at 45° C. to the longitudinal axis of said conduit and adjacent elements being rotated 90° C. with respect to each other.

29. The method of claim 28 wherein the step of delivering said polymeric material further comprises delivering a polymeric material selected from the group consisting of plastisols, silicones, butyls and urethanes.

30. The method of claim 28 wherein said polymeric material is force fed to the inlet of said static mixer at a pressure above approximately 1,000 psi.

31. The method of claim 28 wherein said polymeric material has a viscosity above approximately 10,000 cps.

* * * * *

UNITED STATES PATENT AND TRADEMARK OFFICE
CERTIFICATE OF CORRECTION

PATENT NO. : 5,480,589
DATED : January 2, 1996
INVENTOR(S) : Belser et al.

It is certified that error appears in the above-indentified patent and that said Letters Patent is hereby corrected as shown below:

Col. 6, line 6, delete "90°C" and insert -- 90° -- therefor.

Col. 7, line 23, delete "45°C" and insert -- 45° -- therefor.

Col. 7, line 25, delete "90°C" and insert -- 90° -- therefor.

Col. 14, line 48, delete "45°C" and insert -- 45° -- therefor.

Col. 14, line 55, after "with" insert -- a --.

Col. 15, line 25, after "with" insert -- a --.

Col. 15, line 31, after "injecting" insert -- said --.

Col. 16, line 49, delete "45°C" and insert -- 45° -- therefor.

Col. 16, line 51, delete "90°C" and insert -- 90° -- therefor.

Signed and Sealed this

Twenty-first Day of May, 1996

Attest:

BRUCE LEHMAN

*Attesting Officer*  *Commissioner of Patents and Trademarks*